UNITED STATES PATENT OFFICE.

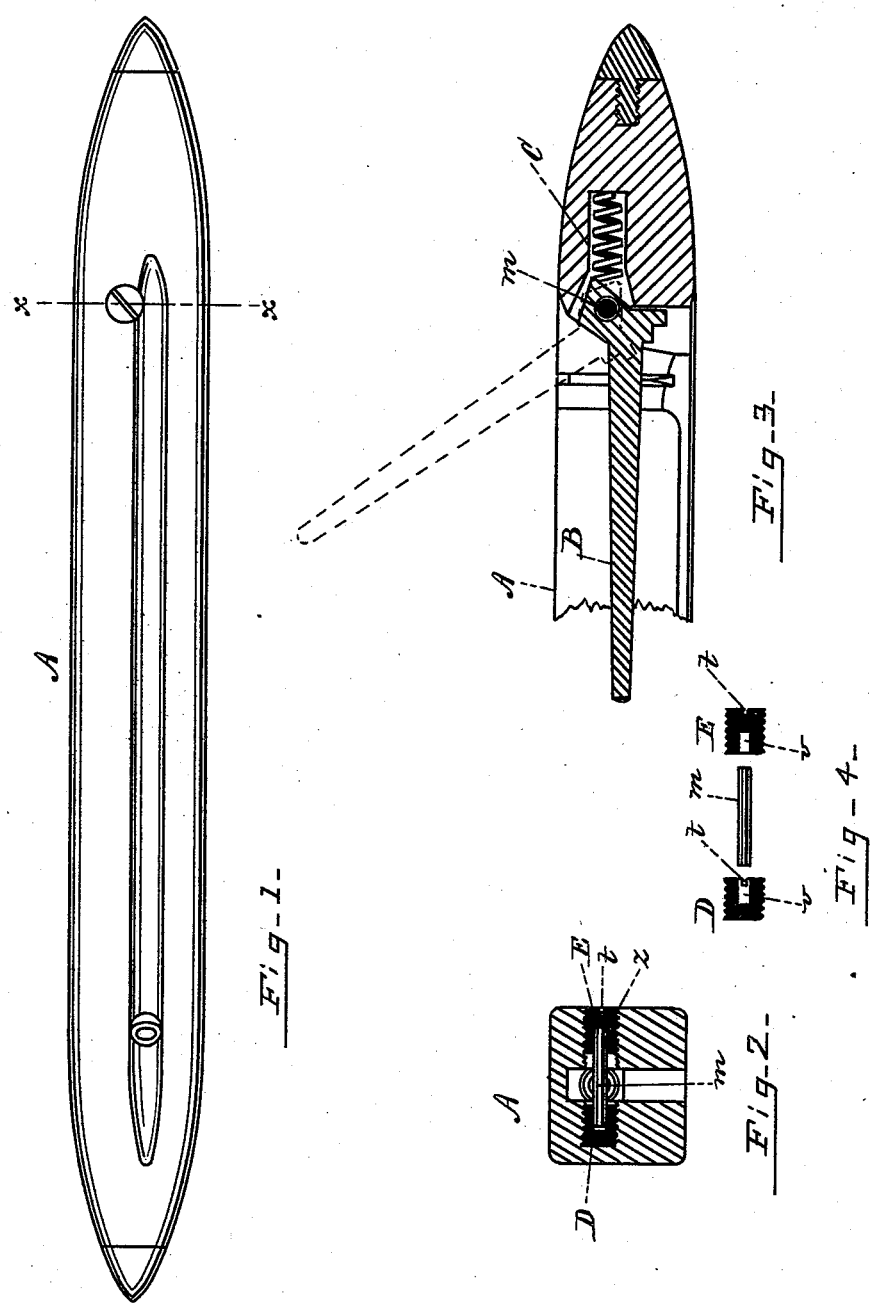

EDWARD DEFOE, OF NASHUA, NEW HAMPSHIRE, ASSIGNOR TO HIMSELF AND ZACHARIAH RABY, OF SAME PLACE.

LOOM-SHUTTLE.

SPECIFICATION forming part of Letters Patent No. 392,994, dated November 20, 1888.

Application filed April 27, 1888. Serial No. 272,060. (No model.)

*To all whom it may concern:*

Be it known that I, EDWARD DEFOE, of Nashua, in the county of Hillsborough and State of New Hampshire, have invented a certain new and useful Improvement in Loom-Shuttles, of which the following is a description sufficiently full, clear, and exact to enable any person skilled in the art or science to which said invention appertains to make and use the same, reference being had to the accompanying drawings, forming part of this specification, in which—

Figure 1 is a side elevation of a loom-shuttle embodying my improvement; Fig. 2, a vertical transverse section taken on line $x$ $x$ in Fig. 1; Fig. 3, a vertical longitudinal section, a portion of the body and spindle of the shuttle being represented as broken off; and Fig. 4, a side elevation, partly in section, of the pin and its bearings detached.

Like letters and figures of reference indicate corresponding parts in the different figures of the drawings.

It is well known that the pin on which the spindle is pivoted in ordinary shuttles is very liable to become loose and protrude from the side of the body, thereby rendering it liable to injure both the shuttle-race and work, and also to fall out and permit the spindle to become detached.

My invention is designed to obviate this objection; and to that end I make use of means which will be readily understood by all conversant with such matters from the following explanation:

In the drawings, A represents the body of the shuttle, B the spindle, and C the spindle-spring, these parts being all of the ordinary form and construction.

The spindle is pivoted on a pin, $m$, which passes transversely through a hole in its head, said hole being located at the same point as in ordinary shuttles. The pin $m$ is shorter than the ordinary pin employed for pivoting the spindle, and does not extend through the body A or protrude from either side thereof, but is supported in bearings D and E. Each of these bearings consists of a short thick screw, having a slot, $t$, and provided with a socket, $v$, in its body, in which one end of the pin $m$ rests. The slot $t$ in the screw D is in the same end as the socket $v$, but in the screw E it is in the end opposite the socket. A hole, $z$, is bored transversely in the body of the shuttle from one side on a line with the pin-hole in the spindle when the spindle is in the shuttle. This hole does not extend entirely through both sides of the body, but is long enough and of proper size to receive both of the screws D E without interfering with the head of the spindle.

In the use of my improvement the screw D is first turned into the hole $z$ until it strikes the bottom of said hole, or nearly so, after which the spindle is placed in position and the pin $m$ inserted in the pin-hole in the spindle-head, the inner end of said pin resting in the socket $v$ in the screw D. The screw E is then turned into the outer end of said hole until its head is flush with the side of the shuttle and the outer end of the pin rests in its sockets $v$, thereby suspending the pin in the screws, as shown in Fig. 2.

It will be obvious that the screws D E will effectually prevent the pin from escaping from the body of the shuttle or injuring the race or work.

If desired, the hole $z$ may be bored entirely through the shuttle and the screws D E inserted in its opposite ends, although I deem it preferable, however, to bore the hole but partially through the body of the shuttle and insert the screws, as shown in Fig. 2.

Having thus explained my invention, what I claim is—

The screw-threaded bearing D, provided with the socket $v$ and slot $t$, both in its inner end, the screw-threaded bearing E, provided with the socket $v$ in its inner end and the slot $t$ in its outer end, the pin $m$, resting in said sockets, the spindle B, pivoted on said pin and provided with a spring, as C, and the body A, provided with the screw-threaded hole $z$, extending inwardly from one side thereof, all combined and arranged to operate substantially as set forth.

EDWARD DEFOE.

Witnesses:
B. B. WHITTEMORE,
RICHARD GREENHALGH.